F. W. WEYMAN.
SHOCK ABSORBER.
APPLICATION FILED JAN. 8, 1912.
1,038,808.
Patented Sept. 17, 1912.
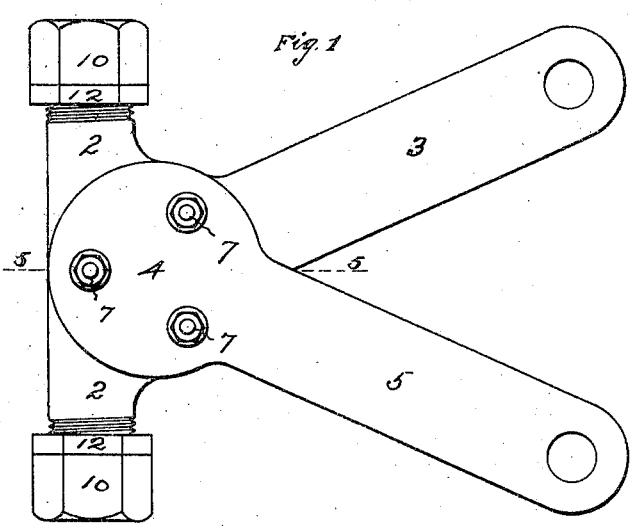
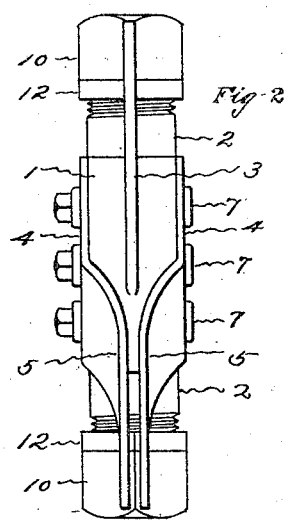
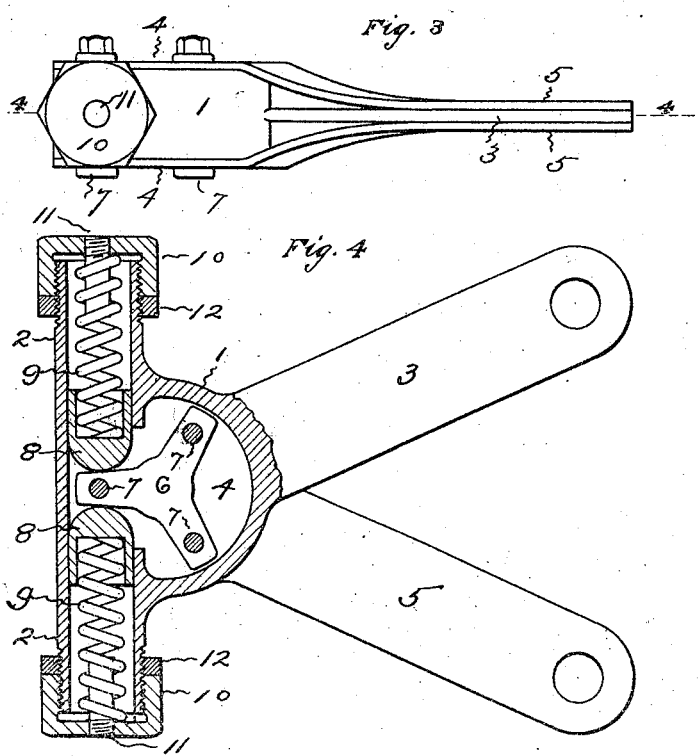
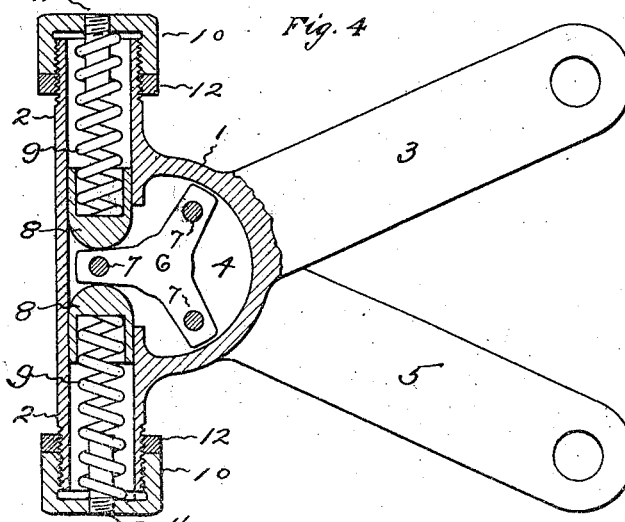
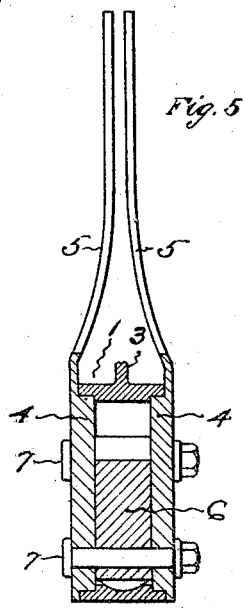
Witnesses:
F. W. Kugler.
Josephine M. Strempfer.
Inventor:
Frederick W. Weyman
by Harry R. Williams
Atty.

UNITED STATES PATENT OFFICE.

FREDERICK W. WEYMAN, OF HARTFORD, CONNECTICUT.

SHOCK-ABSORBER.

1,038,808.  Specification of Letters Patent.  Patented Sept. 17, 1912.

Application filed January 8, 1912. Serial No. 669,992.

*To all whom it may concern:*

Be it known that I, FREDERICK W. WEYMAN, a citizen of the United States, residing at Hartford, in the county of Hartford and State of Connecticut, have invented a new and useful Improvement in Shock-Absorbers, of which the following is a specification.

This invention relates to those devices which are designed to be applied between the bodies and axles of automobiles, more especially of the touring or town car type, for the purpose of absorbing shocks and relieving those in the car from the vibration and jar caused by a rough highway.

The object of this invention is to provide a very simple, cheap, yet strong and noiseless device which can be readily applied to most of the ordinary pleasure automobiles, and particularly to heavy touring and limousine cars, in such manner as to entirely relieve the body from shock and vibration incident to unevennesses of the road over which the machine is driven.

Figure 1 of the accompanying drawings shows a side elevation of a device which embodies the invention. Fig. 2 shows an edge view of the same. Fig. 3 is a plan. Fig. 4 shows a side view of the device with the housing and spring cylinders cut in central vertical section on the plane indicated by the dotted line 4—4 on Fig. 3. Fig. 5 shows a horizontal section on the plane indicated by the dotted line 5—5 on Fig. 1.

The device illustrated has an annular housing 1 with two integrally formed cylinders 2 extending radially in line with each other back of the center of the housing. Projecting from the housing and integrally connected therewith on the front or on the opposite side of the center from the cylinders is an arm 3. This arm is designed to have its outer end connected with the body frame of the car. Fitting the circular openings in opposite sides of the annular housing are two hubs 4. Projecting outwardly from but integral with these hubs are two arms 5. The outer ends of these arms, which are spaced so that the housing arm can move between them, are designed to be connected with the axle of the car chassis. Between the hubs that turn in the housing is a block 6. Bolts 7 pass through the two hubs and the interposed block for securing these parts together. The block spaces the hubs from each other and the bolts fasten the parts together and hold the circular hubs in the open sides of the annular housing so that the hubs and their two projecting arms and the block are secured together and act as one piece. Movable in the cylinders, on opposite sides of a part of the block, are two round-ended hollow plungers 8. Springs 9 are arranged in the cylinders with their inner ends in the hollow plungers. Caps 10 are screwed upon the ends of the cylinders for closing them and for giving the springs the necessary tension to properly force the plungers against the block and yieldingly resist the turning of the block. Pins 11 are fastened in the caps for centering the outer ends of the springs, and check nuts 12 are arranged on the cylinders in such manner that they may be screwed against the caps for locking them in position.

When this device is in use with the intermediate arm, which is integral with the housing, connected with the body frame of the car, and the two outer arms, which are fastened together with the block between them, connected with the chassis axle, all movements of the arms toward and from each other are opposed by the resistance offered by the spring pressed plungers in the cylinders that bear against the opposite sides of the block which is located in the housing and is fastened to the two outer arms. The springs are arranged so that they contract and expand in a straight line, and act powerfully against the block on one side of the axis of the hubs. The tension of the springs is readily adjusted by screwing the caps more or less onto the ends of the cylinders. The hubs fit and bear against the walls of the housing. This construction is very strong and durable for the wearing surfaces of the hubs and housing is large due to the size of the hubs. This not only insures strength and slight wear, but renders the device noiseless, and at the same time provides against the leakage of grease with which the housing and cylinders are desirably filled.

The device is not only strong and simple, but is cheap to construct and easy to assemble. The parts are few, and there is very little machining to be performed in order to make the device operate satisfactorily. The springs can be powerful, and as they work on the block near the axis of the hubs in straight lines, they will produce the desired effect and not get out of repair.

The two outer arms are firmly connected with the block so that they will work together, without danger of their becoming broken or of the hubs being strained out of the housing when subjected to heavy shocks.

The device constructed in this manner is particularly adapted for use with heavy touring cars and cars with heavy limousine bodies.

The invention claimed is:

1. A shock absorber having an annular housing with two opposed cylinders extending tangentially from the edge of the housing back of the center and an integral arm projecting from the housing in front of the center, two circular hubs with their outer edges fitting the interior wall of the housing and having integral arms projecting from their edges in front of the center of the housing, a block interposed between the hubs, means securing the block and the hubs together as one piece, plungers movable in the cylinders and bearing against oppositely disposed surfaces of the block back of the axis of the hubs, springs located in the cylinders and thrusting in straight lines against the plungers, and caps closing the ends of the cylinders and holding the springs in place.

2. A shock absorber having an annular housing with two opposed integral cylinders extending tangentially from the edge back of the center of the housing and an arm projecting from the housing in front of the center, two arms with circular hubs that fit and turn in the open sides of the housing, a spacing block located in the housing between the hubs, bolts extending through the hubs and said block for securing these parts together so that they will act as one piece, hollow plungers with rounded ends movable in the cylinders and engaging oppositely disposed surfaces of a portion of said block back of the axis of the housing, caps fastened upon the ends of the cylinders, and spiral springs located in the cylinders between the plungers and the caps.

3. A shock absorber having an annular housing with two opposed integral cylinders extending tangentially from the edge back of the center of the housing and an integral arm projecting from the housing in front of the center, two arms with integral circular hubs that fit and turn in the open sides of the housing, a spacing block located in the housing between the hubs, bolts extending through the hubs and said block for securing these parts together so that they will act as one piece, hollow plungers with rounded ends movable in the cylinders and engaging oppositely disposed surfaces of a portion of said block back of the axis of the housing, caps screwed upon the ends of the cylinders, spiral springs located in the cylinders between the plungers and the caps, pins carried by the caps for entering the outer ends of the springs, and check nuts turning on the cylinders for locking the caps in place.

FREDERICK W. WEYMAN.

Witnesses:
  JOSEPHINE M. STREMPFER,
  HARRY R. WILLIAMS.